(12) United States Patent
Wang et al.

(10) Patent No.: US 8,690,063 B2
(45) Date of Patent: Apr. 8, 2014

(54) APPARATUS FOR AND METHOD OF ELECTRO-OPTICALLY READING DIRECT PART MARKING INDICIA BY IMAGE CAPTURE

(75) Inventors: Michelle X. Wang, Mount Sinai, NY (US); Dariusz J. Madej, Shoreham, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 0 days.

(21) Appl. No.: 13/461,165

(22) Filed: May 1, 2012

(65) Prior Publication Data

US 2013/0292478 A1    Nov. 7, 2013

(51) Int. Cl.
*G06K 7/10*     (2006.01)
(52) U.S. Cl.
USPC ............... 235/472.01; 235/454; 235/462.45
(58) Field of Classification Search
USPC ............. 235/454, 462.01, 462.11, 462.14, 235/462.15, 462.2, 462.41, 462.42, 235/462.45–462.49, 462.08–462.12, 235/462.25, 472.01–472.03
See application file for complete search history.

(56) References Cited

U.S. PATENT DOCUMENTS

| | | | |
|---|---|---|---|
| 5,308,966 A * | 5/1994 | Danielson et al. | 235/462.23 |
| 7,163,149 B2 | 1/2007 | He et al. | |
| 7,201,321 B2 * | 4/2007 | He et al. | 235/462.2 |
| 7,350,711 B2 | 4/2008 | He et al. | |
| 7,436,496 B2 | 10/2008 | Kawahito | |
| 7,611,060 B2 * | 11/2009 | Wang et al. | 235/462.23 |
| 7,668,406 B2 | 2/2010 | Schnee et al. | |
| 7,671,391 B2 | 3/2010 | Kawahito | |
| 7,726,572 B2 | 6/2010 | He et al. | |
| 8,028,913 B2 | 10/2011 | Liu et al. | |
| 2003/0156303 A1 | 8/2003 | Schnee et al. | |
| 2004/0065154 A1 | 4/2004 | Kibblewhite | |
| 2004/0118919 A1 * | 6/2004 | Breytman et al. | 235/454 |
| 2005/0011956 A1 | 1/2005 | Carlson | |
| 2006/0138234 A1 | 6/2006 | Joseph et al. | |
| 2006/0192938 A1 | 8/2006 | Kawahito | |
| 2007/0064976 A1 | 3/2007 | England, III | |
| 2007/0158770 A1 * | 7/2007 | Kawahito | 257/431 |
| 2009/0039157 A1 * | 2/2009 | Reichenbach et al. | 235/436 |
| 2009/0079954 A1 | 3/2009 | Smith et al. | |
| 2009/0218403 A1 * | 9/2009 | Joseph et al. | 235/462.21 |
| 2009/0230437 A1 | 9/2009 | Kawahito et al. | |
| 2010/0328682 A1 | 12/2010 | Kotake et al. | |

OTHER PUBLICATIONS

Lange, R., et al., "Time-of-flight range imaging with a custom solid-state image sensor," Laser Metrology and Inspection, Proc. SPIE, 1999, vol. 3823, pp. 12.

(Continued)

*Primary Examiner* — Tuyen K Vo
(74) *Attorney, Agent, or Firm* — Nong-Qiang Fan (57) ABSTRACT

An apparatus and method electro-optically read indicia, such as a direct part marking (DPM) code, that is raised or sunken relative to a target surface on a target. A solid-state, distance imaging sensor captures a target image comprised of a first set of pixels having first distance values that correspond to a first distance of the code from the sensor, and a second set of pixels having second distance values that correspond to a second distance of the target surface from the sensor. A controller reads the indicia by distinguishing between the first set of pixels and the second set of pixels within the image, by determining abrupt changes in the distance values among neighboring pixels.

20 Claims, 3 Drawing Sheets

(56) References Cited

OTHER PUBLICATIONS

Range Imaging Sensor Project extracted from Vladimir Brajovic's website (undated).

Mar. 24, 2006 "Sharp Develops CMOS Image Sensor Able to Measure Distance to Object".

PCT International Search Report Dated Jun. 26, 2013 for Counterpart Application PCT/US2013/034936.

* cited by examiner

APPARATUS FOR AND METHOD OF ELECTRO-OPTICALLY READING DIRECT PART MARKING INDICIA BY IMAGE CAPTURE

FIELD OF THE DISCLOSURE

The present disclosure relates generally to an apparatus for, and a method of, electro-optically reading direct part marking (DPM) indicia, such as raised, sunken or etched, optical codes, on workpieces by image capture.

BACKGROUND

Direct part marking (DPM) has allowed workpieces to be directly marked, identified and traced to their origin, and its use has been growing in the automotive, aerospace, electronics, medical equipment, tooling, and metalworking industries, among many others. A typical DPM is a machine-readable, high-density, two-dimensional, matrix-type, optical code, e.g., the known DataMatrix or QR codes, although one-dimensional optical codes are also known. Each DPM code is comprised of multiple elements that are directly marked (imprinted, etched, molded, or dot-peened) on a workpiece. For example, an outer surface of a metal workpiece may advantageously be dot-peened with such sunken elements as hemispherical depressions; an outer surface of a plastic workpiece may advantageously be molded with such raised elements as hemispherical bumps; and a laser may be used to etch elements of different light reflectivity closely adjacent an outer surface of a workpiece. Other shapes for the elements, and other marking techniques, may also be used.

Despite the ability to control very tight specifications on element size, width, spacing and so on, the lack of sharp contrast of machine-readable optical DPM codes directly marked on metal, plastic, leather, glass, etc., workpieces has prevented traditional moving laser beam readers from electro-optically reading the DPM codes reliably. These moving beam readers emitted a laser beam, which reflected off the highly reflective, typically non-planar, metal or glass, workpieces as bright return light that saturated on-board photodetectors.

Instead of moving laser beam readers, solid-state imaging readers have been used to electro-optically read by image capture diverse indicia, including DPM codes. The imaging reader included a solid-state imager (also known as an imaging sensor) with a sensor array of photocells (also known as pixels), which corresponded to image elements or pixels over a field of view of the imaging sensor, an illumination assembly for illuminating the field of view with illumination light, an imaging lens assembly for capturing return ambient and/or illumination light scattered and/or reflected from a DPM workpiece in the field of view, and for projecting the return light onto the imaging sensor to initiate capture of an image of the DPM workpiece in the field of view, and a microprocessor for analyzing, processing and decoding the DPM code from the captured image.

Yet, the use of imaging readers, especially handheld readers, for reading DPM codes on workpieces has proven to be challenging. Each DPM code is relatively small, e.g., less than 2 mm×2 mm. The workpieces themselves often have complicated, i.e., non-planar, curved, reflective surfaces. Contrast between the DPM codes and their workpiece backgrounds, especially from their outer, reflective background surfaces, is still often less than desirable. Unlike machine-readable codes printed in one color (for example, black) on paper of another color (for example, white), DPM codes are typically read not by a difference in intensity of the return light between regions of different color, but by shadow patterns that are cast by the raised or sunken or etched elements. Ambient lighting conditions, however, are variable. Illumination from the on-board illumination assembly is directed at variable angles. Reflections from ambient light sources and the illumination assembly often appear in the field of view of the imaging reader as hot spots, glare, or specular reflections of intense, bright light that saturate the imaging sensor, thereby degrading reading performance.

The art has attempted to enable imaging readers to more readily read DPM codes. For example, U.S. Pat. No. 8,028,913 described the use of a diffuser to diffuse the illumination light directed to the DPM code, U.S. Pat. No. 7,201,321 described a technique to enhance the contrast of the DPM code, U.S. Pat. No. 7,726,572 described a digitization technique for digitizing the DPM code, U.S. Pat. No. 7,350,711 described the use of ambient light shields and filters to read the DPM code, U.S. Pat. No. 7,163,149 described the use of more than one illuminating light assembly to illuminate the DPM code, U.S. Patent Publication No. 2009/0218403 described an enhanced aiming technique to locate the DPM code, and U.S. Patent Publication No. 2006/0138234 described an extended dynamic range in which the DPM code could be read.

Yet, as advantageous as such attempts have been, there is still a need to enhance the readability of DPM codes by image capture in a more cost-efficient and rapid manner without resorting to extra hardware that increases cost and weight, and without resorting to extra software that slows reading performance.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

An apparatus, in accordance with one feature of this invention, is operative for electro-optically reading indicia, such as a direct part marking (DPM) code, on a target, such as a workpiece, having a target surface. The indicia may have elements located at a different elevation than the target surface. In the case of the DPM code whose elements are, e.g., bumps or depressions, these elements are arranged, for example, in a matrix-type array, and are either raised and/or sunken relative to the target surface. Other types of raised or sunken indicia, and even etched indicia of different light reflectivity closely adjacent the target surface, may be read, as described below.

The apparatus includes a housing, preferably having at least one light-transmissive window. The apparatus is preferably configured as a handheld, portable scanner, but could also be configured as a stand-mounted, stationary scanner, a vertical slot scanner, a flat-bed or horizontal slot scanner, or a bi-optical, dual window scanner. The apparatus advantageously also includes an illumination system supported by the housing and energizable for illuminating the target with illumination light, preferably emitted from at least one light emitting diode.

The apparatus further includes a solid-state, distance imaging sensor supported by the housing and having an array of light-detecting photocells looking at a field of view that extends through the window to the target, and a controller, e.g., a programmed microprocessor, for controlling the distance sensor. The distance sensor is operative for capturing a target image comprised of a first set of pixels having first distance values that correspond to a first distance of the elements from the distance sensor, and a second set of pixels having second distance values that correspond to a second distance of the target surface from the distance sensor. The controller is operatively connected to the distance sensor and is operative for reading the indicia by distinguishing between the first set of pixels and the second set of pixels within the image. Advantageously, the controller looks for abrupt changes in the distance values, i.e., local maxima or minima, among neighboring pixels to locate the elements of the indicia to be read. Preferably, the distance sensor includes a light emitter that emits light pulses, e.g., of infrared (IR) light, to the target for return therefrom. The sensor detects return IR light pulses after delay times, and the controller determines each of the first and second distances from the delay times based on the constant known speed of light.

Figures 1, 2:
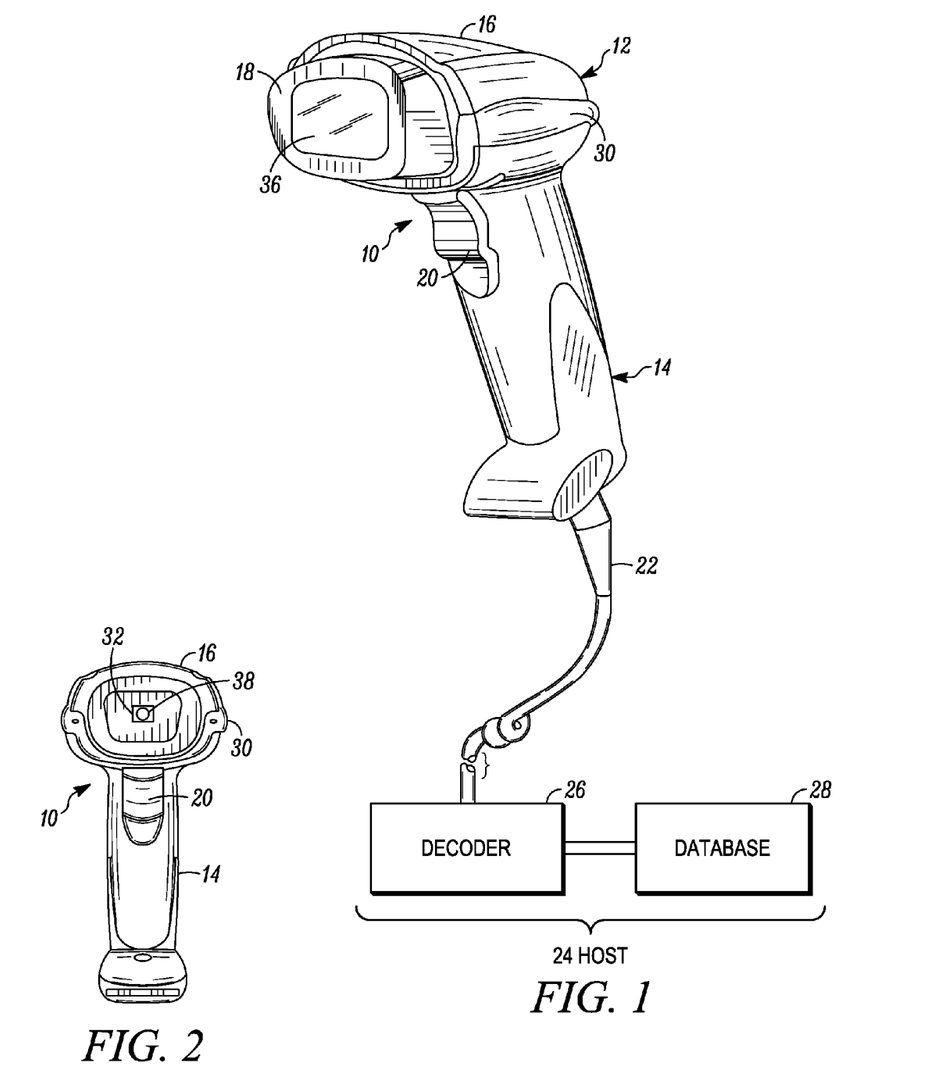
FIG. 1 is a perspective view of an exemplary imaging reader for electro-optically reading raised, sunken or etched indicia, such as a DPM code, by image capture in accordance with this invention.
FIG. 2 is a front elevational view on a reduced scale of the reader of FIG. 1.
Figure 3:
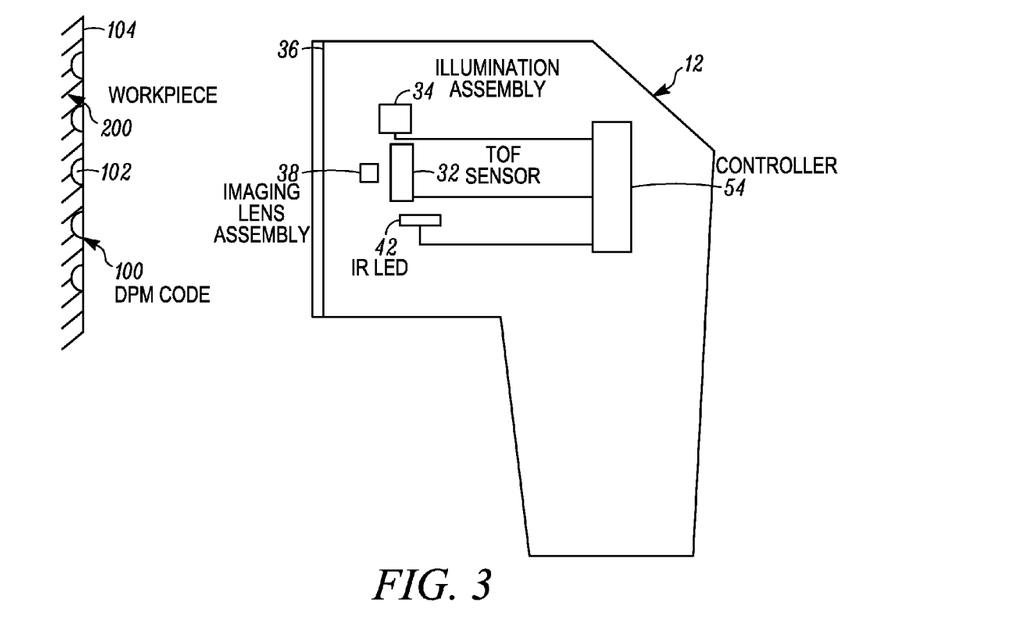
FIG. 3 is a diagrammatic, simplified view of a reader analogous to that shown in FIG. 1, depicting various components thereof.
Figure 4:
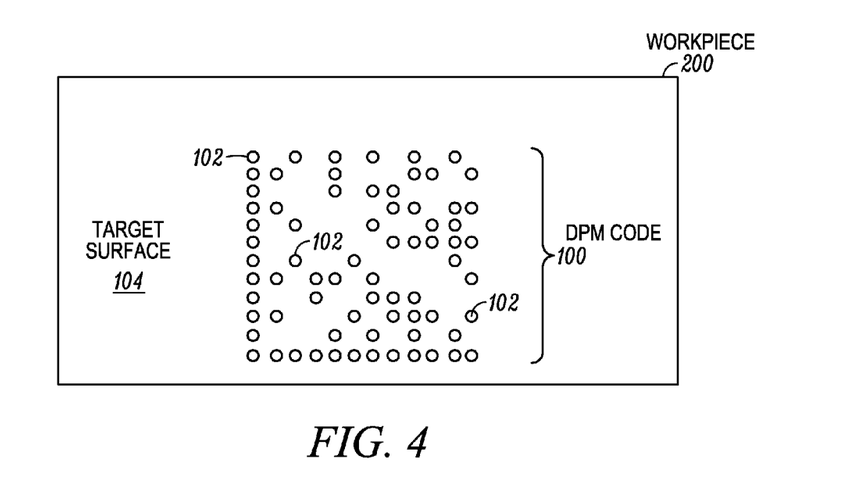
FIG. 4 is an enlarged view of an exemplary DPM code to be read.

Reference numeral 10 in FIGS. 1-2 generally identifies an exemplary, handheld, portable imaging reader for electro-optically reading indicia, such as a DPM code 100 (see FIGS. 3-4) on a workpiece 200 (see FIGS. 3-4). The reader 10 includes a housing 12 in which illuminating and image capture assemblies, as described below, are incorporated. The housing 12 includes a generally elongated handle or lower handgrip portion 14 and a barrel or upper body portion 16 having a front end region 18. The cross-sectional dimensions and overall size of the handle 14 are such that the reader can conveniently be held in an operator's hand. The body and handle portions may be constructed of a lightweight, resilient, shock-resistant, self-supporting material, such as a synthetic plastic material. The plastic housing may be injection molded, but can be vacuum-formed or blow-molded to form a thin hollow shell which bounds an interior space whose volume is sufficient to contain the various assemblies of this invention. An overmold 30 of a resilient, shock-absorbing material, such as rubber, is exteriorly molded at various regions over the housing for shock protection.

A manually actuatable trigger 20 is mounted in a moving relationship on the handle 14 in a forward facing region of the reader. The operator's forefinger is normally used to actuate the reader by depressing the trigger. For example, the trigger may be depressed once to initiate aiming, and depressed again to initiate image capture and reading. Alternatively, aiming may be a default condition, and the trigger may be depressed just once to discontinue or change the default condition and to initiate image capture and reading. A flexible electrical cable 22 may be provided to connect the reader to remote components of the code reading system. In alternative embodiments, the cable 22 may also provide electrical power to the electrical components within the reader. In preferred embodiments, the cable 22 is connected to a host 24 that receives decoded data from the reader. In alternative embodiments, a decode module 26 may be provided exteriorly to the reader. In such an embodiment, decoded data from the decode module 26 may be transmitted to further host processing equipment and databases represented generally by box 28. If the cable 22 is not used, then a wireless link to transfer data may be provided between the reader 10 and the host 24, and an on-board battery, typically within the handle 14, can be used to supply electrical power.

An alternative embodiment incorporates a display and a keyboard, and optionally a wireless transceiver, preferably with an on-board decode module 26. The decoded data is then either transferred to a remote host computer in real time, or saved to an internal memory such that the stored data can be transferred to a host computer at a later time in batch mode, when the reader is physically connected to such a connected host computer.

As shown in FIGS. 3-4, the DPM code 100 is comprised of multiple elements 102 that are directly marked (imprinted, etched, molded, or dot-peened) on the workpiece 200. For example, an outer target surface 104 of a metal workpiece 200 may advantageously be dot-peened with such sunken elements 102 as hemispherical depressions that are located below, or behind, the target surface 104; or the outer target surface 104 of a plastic workpiece 200 may advantageously be molded with such raised elements 102 as hemispherical bumps that are located above, or in front of, the target surface 104; or the outer target surface 104 of any workpiece 200 may advantageously be etched with, for example, a laser, to form elements 102 of different light reflectivity closely adjacent the outer target surface 104 of the workpiece 200. Shapes, other than the circular shapes illustrated in FIG. 3, for the elements 102, and marking techniques, other than laser-etching, are also contemplated by this disclosure. Although illustrated in FIG. 3 as being arranged in a two-dimensional matrix-type array, the elements 102 can also be linearly arranged as a character string. In practice, the raised or sunken elements 102 are located at an elevation (height or depth) that is about one millimeter or less away from the target surface 104, while the etched elements 102 are generally flush with the target surface 104.

As described above, the raised or sunken DPM code 100 is often difficult to read due to poor contrast between the elements 102 and the target surface 104, which are typically constituted of the same material. This is in contradistinction to optical codes printed with ink in one color (for example, black) on a paper background of another color (for example, white), where regions of different color have a better contrast. As explained below, this disclosure proposes not to rely exclusively on such color or intensity differences, but to rely, instead, substantially on distance differences between the elements 102 and the background target surface 104, to read the raised or sunken DPM code 100. These distance differences cast brighter and darker shadow patterns that can be decoded, as described below.

To determine these distance differences, a solid-state, distance imaging sensor 32, as shown in FIG. 3, is mounted within the housing 12, the housing being illustrated in a simplified form for clarity. The distance sensor 32, preferably, is a two-dimensional, complementary metal oxide semiconductor (CMOS) array of photocells operative, when energized by a controller or programmed microprocessor 54, for capturing return light over its field of view from the workpiece 200 through a light-transmissive window 36 at the front end region 18 to seal the housing 12 from entry of contaminants. An imaging lens assembly 38 is aligned with the distance sensor 32 for projecting the return light onto the distance sensor 32. An infrared (IR) light emitter 42 is located adjacent the distance sensor 32 and is also energizable by the controller 54. An illumination assembly 34 is preferably provided to energize an illumination field for the distance sensor 32 under the control of the controller 54. The illumination assembly 34 preferably constitutes a single illumination light source, or a plurality of illumination light sources, e.g., light emitting diodes (LEDs), powered by power supply lines in the cable 22, or via the on-board battery.

The distance sensor 32 determines each distance to the elements 102 and to the background target surface 104 by use of a time-of-flight (TOF) method as the distance measurement technique, in which each distance is back-calculated from the flight time of light, as follows: First, an IR light pulse emitted from the IR emitter 42 is directed to the elements 102/target surface 104 at a fixed time interval. Next, the reflected light pulse from the elements 102/target surface 104 is detected by the photocells of the distance sensor 32. Then, the flight time of the IR light pulse is obtained based on the phase difference between the emitted and reflected IR light pulses. Finally, the resultant flight time is multiplied by the speed of light to obtain the distance to the elements 102/target surface 104. The distance sensor 32 preferably has an effective pixel count of at least 320×240, a frame rate of at least 30 frames per second, and a range resolution of at least about 100 micrometers at a range of about one meter. U.S. Pat. No. 7,436,496, U.S. Pat. No. 7,671,391, and U.S. Patent Publication No. 2009/0230437 describe distance sensors, primarily used for military applications.

Thus, the distance sensor 32 is operative for capturing a target image comprised of a first set of pixels having first distance values that correspond to a first distance of the elements 102 from the distance sensor 32, and a second set of pixels having second distance values that correspond to a second distance of the target surface 104 from the distance sensor 32. The controller 54 is operatively connected to the distance sensor 32 and is operative for reading the indicia by distinguishing between the first set of pixels and the second set of pixels within the target image. More particularly, the controller 54 looks for abrupt changes in the distance values, i.e., local maxima or minima, among neighboring pixels to locate the elements of the indicia to be read.

By way of further explanation, assume that the target surface 104 is not marked with the elements 102, is planar, and is parallel to the planar array of photocells in the distance sensor 32. In that event, the controller 54 will see substantially no, or little, change in the distance values among the neighboring pixels arranged along the photocell rows. If this unmarked target surface 104 is inclined relative to any one or more of the three position axes (i.e., tilt, rotation, or yaw), then the controller 54 will see a substantially constant change in the distance values among the neighboring pixels along each axis. If this unmarked target surface 104 is smoothly curved, then the controller 54 will see a substantially smooth change in the distance values among the neighboring pixels. However, once the target surface 104 is marked with raised or sunken elements 102, then the controller 54 will see the aforementioned localized abrupt changes in the distance values, and these points of inflection represent the raised or sunken elements 102. For raised indicia, the controller 54 identifies these points of inflection in the field of view, which are generally brighter because they are physically closer to the distance sensor 32. Analogously, for sunken indicia, the controller 54 identifies these points of inflection in the field of view, which are generally darker because they are physically further from the distance sensor 32. Once the elements 102 are identified by the controller, the controller 54 decodes them to read the indicia.

As described so far, each pixel has a distance value that represents the distance between a point on the workpiece 200 and its image on a photocell in the distance sensor 32. Advantageously, each pixel also has an intensity or luminance value that represents the amount of return light reflected and/or scattered off the respective point of the workpiece. This intensity value can be used, together with the distance value, to insure that for the elements 102 have been properly identified by the controller 54. Alternatively, this intensity value can be used by itself to read the aforementioned laser-etched elements 102 of different light reflectivity that are closely adjacent the target surface 104.

In accordance with another aspect of this invention, a method of electro-optically reading indicia having elements on a target having a target surface, is performed by locating the elements at a different elevation than the target surface; by capturing a target image of the target with a solid-state, distance imaging sensor having an array of light-detecting photocells looking at a field of view that extends to the target, the target image being comprised of a first set of pixels having first distance values that correspond to a first distance of the elements from the sensor, and a second set of pixels having second distance values that correspond to a second distance of the target surface from the sensor; and by reading the indicia by distinguishing between the first set of pixels and the second set of pixels within the image.

Figure 5:
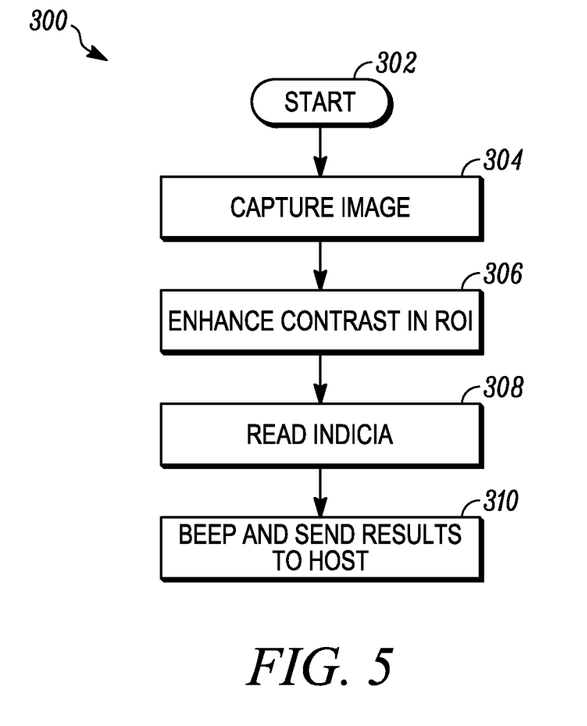
FIG. 5 is a flow chart depicting a method of reading raised, sunken, or etched indicia by image capture in accordance with this invention.

With the aid of the operational flow chart 300 of FIG. 5, in operation, beginning at start step 302, the controller 54 energizes the distance sensor 32, the illumination assembly 34 and the IR LED 42, and captures the image of the illuminated elements 102 and the illuminated target surface 104 in the field of view at step 304. Each pixel of the captured image advantageously contains both a distance value (that represents the distance or range of a respective point on the workpiece relative to the distance sensor 32) and a luminance or light intensity value (that represents the amount of return light reflected and/or scattered off the respective point of the workpiece). By default, the controller 54 initially tries to read and decode the indicia based on the intensity values (step 308) from all the photocells. This may be sufficient to read the aforementioned laser-etched DPM codes whose elements 102 have different light reflectivity, or even other optical codes whose reading depends on distinguishing between different light-modifying elements. If the decode was successful, a beep is sounded, and the results are sent to the host 24 (step 310).

If the decode was unsuccessful, then the controller 54 analyzes the distance values from all the photocells to not only model the target surface 104 (i.e., is it flat or curved), but also to look for abrupt changes in the distance values, i.e., local maxima or minima (inflection points), among neighboring pixels to locate the elements 102 of the indicia to be read. By knowing the changes or gradient of the distance values, the controller 54 can thus determine the shape, and isolate the light pattern that represents the elements 102, thereby identifying a region of interest (ROI) in the image in which that light pattern is located, enhance the contrast of that light pattern (step 306) if desired, proceed to decode that light pattern (step 308) to read the indicia, and finally send the results of a successful decoding to the host 24 (step 310). Thus, by capturing the intensity values and/or the distance values, any raised/sunken/etched indicia could be read, without requiring specialized hardware that minimizes specular reflection, and without requiring specialized software that slows reading, thereby rendering reading more robust and aggressive.

It will be understood that each of the elements described above, or two or more together, also may find a useful application in other types of constructions differing from the types described above.

For example, rather than using the time-of-flight distance sensor 32, distance can also be measured by stereo triangulation (height/depth is computed from a difference between two images taken by two imaging sensors), or by a light-field camera.

Furthermore, this disclosure is not intended to be restricted to reading DPM codes, because other raised/sunken/etched indicia could be read. For example, credit/debit cards have raised indicia, e.g., a number and/or other data, elevated above its background surface. The background surface of the card is typically highly reflective and bears busy graphic patterns, all of which renders the contrast between the raised indicia and the background card surface to be very low. Automatic optical character recognition (OCR) and reading is therefore problematic, and the above-described distance sensing technique facilitates such OCR reading. As another example, a vehicle license plate has raised indicia, e.g., alphanumeric characters and/or other data, elevated above its background plate surface. The background surface of the plate is typically highly reflective, and poor contrast between the raised indicia and the background plate surface is aggravated by ever present dirt and mud on the plate surface, as well as damage to the plate. As still another example, seals impressed into a document could be read and verified.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing," or any other variation thereof, are intended to cover a non-exclusive inclusion, such that a process, method, article, or apparatus that comprises, has, includes, contains a list of elements does not include only those elements, but may include other elements not expressly listed or inherent to such process, method, article, or apparatus. An element proceeded by "comprises . . . a," "has . . . a," "includes . . . a," or "contains . . . a," does not, without more constraints, preclude the existence of additional identical elements in the process, method, article, or apparatus that comprises, has, includes, or contains the element. The terms "a" and "an" are defined as one or more unless explicitly stated otherwise herein. The terms "substantially," "essentially," "approximately," "about," or any other version thereof, are defined as being close to as understood by one of ordinary skill in the art, and in one non-limiting embodiment the term is defined to be within 10%, in another embodiment within 5%, in another embodiment within 1%, and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors, and field programmable gate arrays (FPGAs), and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein, will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

The invention claimed is:

1. An apparatus for electro-optically reading indicia on a target having a target surface, the indicia having elements located at a different elevation than the target surface, the apparatus comprising:
   a housing;
   a solid-state, distance imaging sensor supported by the housing and having an array of light-detecting photocells looking at a field of view that extends to the target, the distance imaging sensor including a light emitter that emits light to the target for return therefrom, and operative for capturing a target image comprised of a first set of pixels having first distance values that correspond to a first distance of the elements from the sensor, and a second set of pixels having second distance values that correspond to a second distance of the target surface from the sensor, wherein each pixel has a distance value and a light intensity value, with the distance value of each pixel determined by the delay time between the instant when light is emitted by the light emitter and the instant when return light is detected by one of the light-detecting photocells; and
   a controller operatively connected to the sensor and operative for reading the indicia by analyzing the distance values of multiple neighborhood pixels to distinguish between the first set of pixels and the second set of pixels within the image, said analyzing the distance values of the multiple neighborhood pixels includes finding changes in the distance values among the multiple neighborhood pixels.

2. The apparatus of claim 1, and an illumination system supported by the housing and energizable by the controller for illuminating the target with illumination light, and wherein the photocells detect the illumination light returning from the illuminated target.

3. The apparatus of claim 1, wherein the illumination system includes at least one light emitting diode.

4. The apparatus of claim 1, and a light-transmissive window supported by the housing, and wherein the sensor captures the target image through the window.

5. The apparatus of claim 4, wherein the window faces the target, which is configured as a workpiece, on which the indicia, which is configured as a direct part marking, is marked.

6. The apparatus of claim 5, wherein the direct part marking is an optical code that is raised relative to the target surface.

7. The apparatus of claim 5, wherein the direct part marking is an optical code that is sunken relative to the target surface.

8. The apparatus of claim 1, wherein the sensor includes a light emitter that emits light pulses to the target for return therefrom, and wherein the sensor detects return light pulses after delay times, and wherein the controller determines each of the first and second distances from the delay times.

9. The apparatus of claim 1, wherein the controller is operative for determining abrupt changes in the distance values among neighboring pixels.

10. The apparatus of claim 1, wherein the controller is operative for determining abrupt changes in at least one of the distance values and in the intensity values among neighboring pixels.

11. An apparatus for electro-optically reading a direct part marking (DPM) optical code on a workpiece having a target surface, the code having elements located at a different elevation than the target surface, the apparatus comprising:
   a handheld housing;
   a light-transmissive window supported by the housing;
   an energizable illumination system supported by the housing operative for illuminating the workpiece with illumination light;
   a solid-state, distance imaging sensor supported by the housing and having an array of light-detecting photocells looking at a field of view that extends through the window to the illuminated workpiece, the distance imaging sensor including a light emitter that emits light to the target for return therefrom, and operative for capturing a target image comprised of a first set of pixels having first distance values that correspond to a first distance of the elements from the sensor, and a second set of pixels having second distance values that correspond to a second distance of the target surface from the sensor, wherein each pixel has a distance value and a light intensity value, with the distance value of each pixel determined by the delay time between the instant when light is emitted by the light emitter and the instant when return light is detected by one of the light-detecting photocells; and
   a controller operatively connected to the sensor and the illumination system, and operative for reading the code by distinguishing between the first set of pixels and the second set of pixels within the image by determining abrupt changes in the distance values among neighboring pixels.

12. A method of electro-optically reading indicia having elements on a target having a target surface, comprising:
   locating the elements at a different elevation than the target surface;
   capturing a target image of the target with a solid-state, distance imaging sensor having an array of light-detecting photocells looking at a field of view that extends to the target, the distance imaging sensor including a light emitter that emits light to the target for return therefrom, the target image being comprised of a first set of pixels having first distance values that correspond to a first distance of the elements from the sensor, and a second set of pixels having second distance values that correspond to a second distance of the target surface from the sensor, wherein each pixel has a distance value and a light intensity value, with the distance value of each pixel determined by the delay time between the instant when light is emitted by the light emitter and the instant when return light is detected by one of the light-detecting photocells; and
   reading the indicia by analyzing the distance values of multiple neighborhood pixels to distinguish between the first set of pixels and the second set of pixels within the image, said analyzing the distance values of the multiple neighborhood pixels includes finding changes in the distance values among the multiple neighborhood pixels.

13. The method of claim 12, and illuminating the target with illumination light, and detecting the illumination light returning from the illuminated target with the photocells.

14. The method of claim 12, wherein the capturing is performed by capturing the target image through a window.

15. The method of claim 12, and configuring the target as a workpiece, and configuring the indicia as a direct part marking on the workpiece.

16. The method of claim 15, and configuring the direct part marking as an optical code, and wherein the locating is performed by locating the code at an elevation that is raised above the target surface.

17. The method of claim 15, and configuring the direct part marking as an optical code, and wherein the locating is performed by locating the code at an elevation that is sunken below the target surface.

18. The method of claim 12, wherein the capturing is performed by emitting light pulses to the target for return therefrom, and by detecting return light pulses after delay times, and wherein the reading is performed by determining each of the first and second distances from the delay times.

19. The method of claim 12, wherein the distinguishing is performed by determining abrupt changes in the distance values among neighboring pixels.

20. The method of claim 12, wherein the distinguishing is performed by determining abrupt changes in at least one of the distance values and in the intensity values among neighboring pixels.

* * * * *